INVENTOR
Stanley J. Whittaker
BY Alex. E. MacRae
ATTORNEY

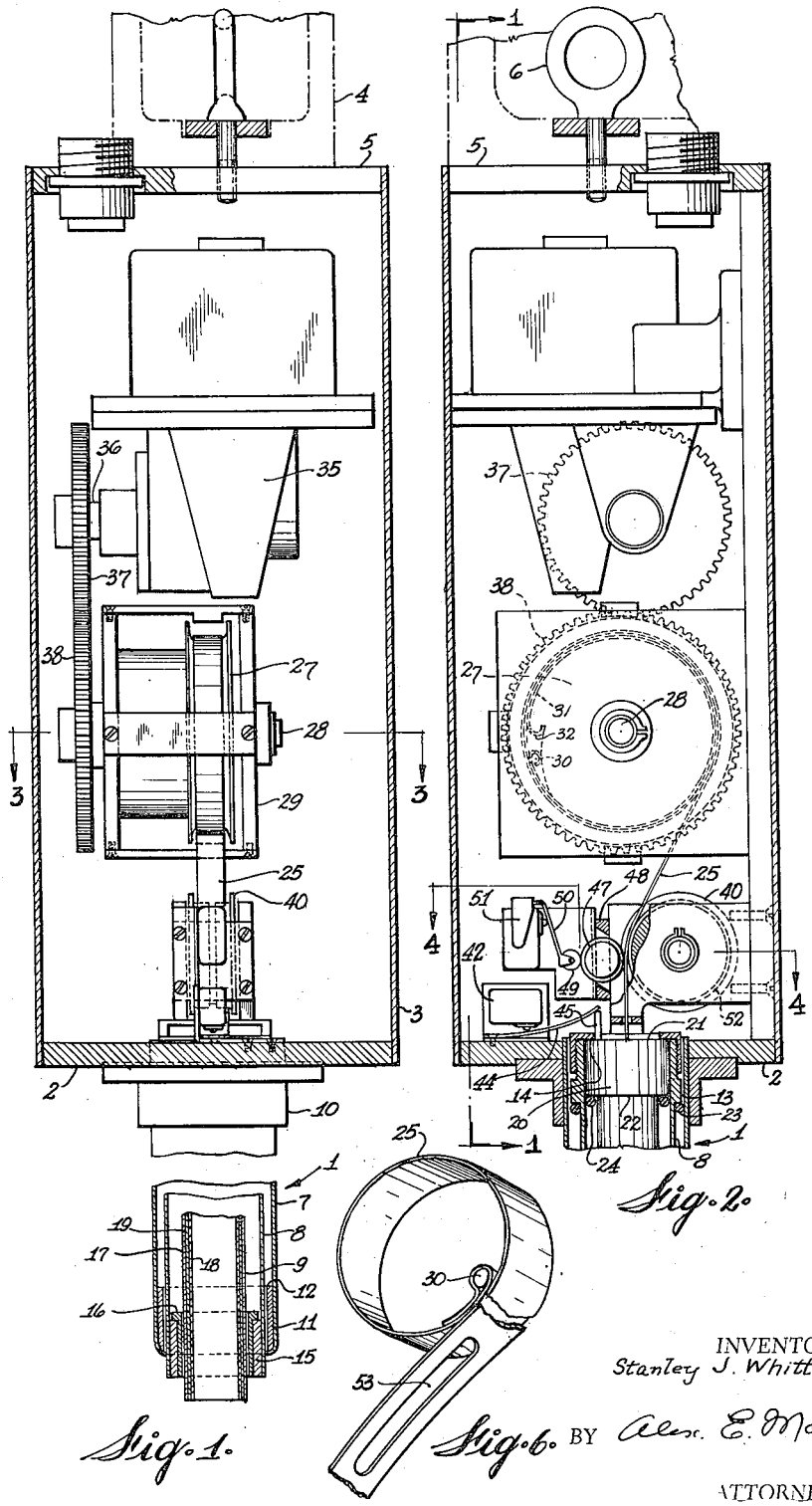

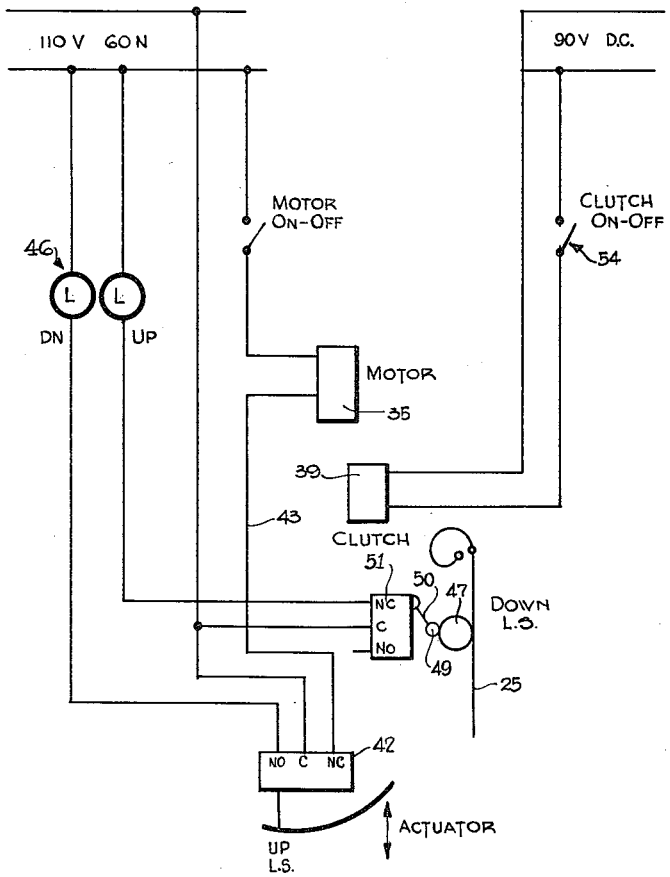

3,085,962
REACTOR ABSORBER ROD AND RETRACTING MECHANISM THEREFROM

Stanley J. Whittaker, Deep River, Ontario, Canada, assignor to Atomic Energy of Canada Limited, Ottawa, Ontario, Canada, a corporation
Filed Aug. 21, 1959, Ser. No. 835,203
2 Claims. (Cl. 204—193.2)

This invention relates to absorber rods for heavy water vertical type reactors and retracting mechanism therefor.

In heavy water vertical type reactors, one or more absorber rods are positioned in the moderator during operation thereof. It is highly desirable to provide means for quickly and conveniently retracting the absorber rod from the moderator and for repositioning the rod in the moderator as required.

It is an object of this invention to provide an absorber rod which is capable of desired positioning with respect to the moderation of a reactor and having mechanism associated therewith for quickly and conveniently effecting such positioning.

The invention will be described with reference to the accompanying drawings, in which FIGURE 1 is a sectional side elevation of an absorber rod and positioning mechanism therefor.

Figure 3:
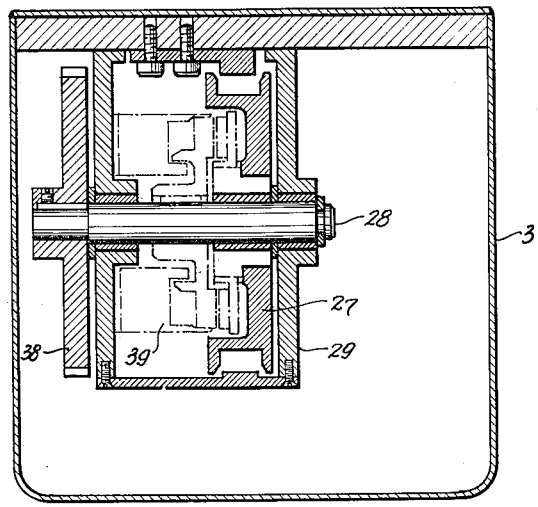
Figure 4:
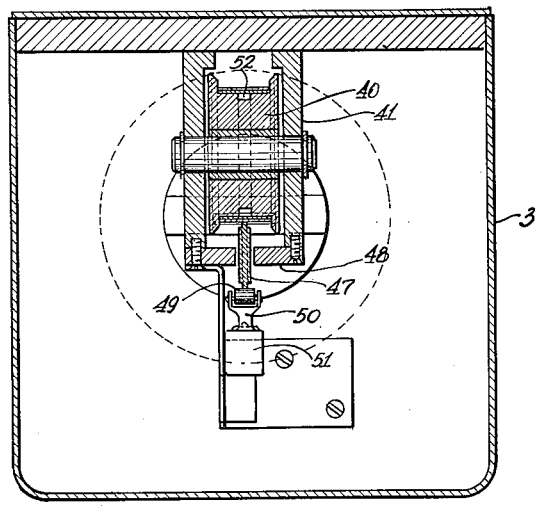
Figure 5:
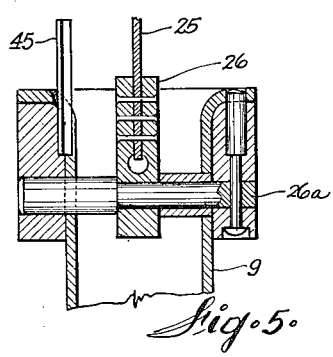
Figure 7:
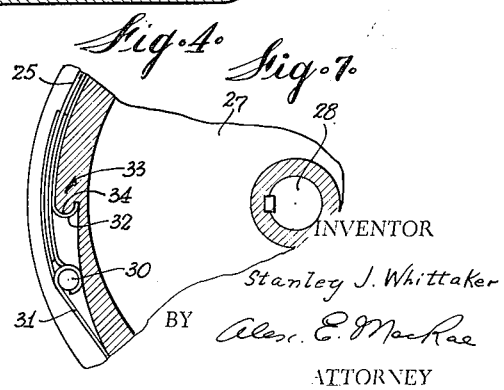

FIGURE 2 is another sectional side elevation of the absorber rod and positioning mechanism, FIGURE 3 is a section on line 3—3 of FIGURE 1, FIGURE 4 is a section on line 4—4 of FIGURE 1, FIGURE 5 is an enlarged sectional side elevation of a portion of the absorber rod, FIGURE 6 is a perspective view of a section of a lifting tape, FIGURE 7 is an enlarged elevation of the lifting tape connection with a winding drum, and FIGURE 8 is a wiring diagram.

In the drawings, the absorber rod assembly illustrated comprises an absorber rod 1 mounted on one end or bottom wall 2 of a housing 3 and a hanger 4 mounted on the other end or top wall 5 of the housing. A cannon connector 6 is also indicated as mounted in end wall 5.

The absorber rod 1 comprises, as shown, three telescopic sections 7, 8 and 9. Section 7 of largest diameter comprises a thin-walled tube having its upper end fixed to end wall 2 of the housing as by means of a fitting 10. The lower end of section 7 has a bushing 11 fixed to the interior surface thereof to provide an internal annular shoulder 12.

Section 8 of intermediate diameter also comprises a thin-walled tube having an external annular shoulder 13 adjacent its upper end. Section 8 also has an internal annular shoulder 14 at its upper end. At its lower end, section 8 has a two-part bushing 15 fixed to its interior surface and providing an internal annular shoulder 16.

Section 9 of smallest diameter comprises a thin-walled tubular member having, as shown, inner and outer tubes 17 and 18 between which is positioned a cadmium sheet 19. Section 9 has a bushing 20 fixed to the external surface thereof adjacent its upper end to provide upper and lower external annular shoulders 21 and 22.

It will be understood that in the extended position of the rod, shoulder 13 of section 8 will be seated upon shoulder 12 of section 7 and shoulder 22 of section 9 will be seated upon shoulder 16 of section 8. It will also be apparent that, with the sections in extended relation, if an upward pull is exerted on inner section 9 it will be telescopically received into section 8 until its shoulder 21 seats upon shoulder 14 of section 8. Further upward pull on section 9 will move it and section 8 into telescopic relation with outer section 7 and when the upper ends of the three sections are in approximate registry, the rod is fully retracted.

When the rod sections are in retracted position, release of inner section 9 will result in dropping by gravity of sections 9 and 8 to fully extended position as previously described. Shock absorbing means are preferably provided to cushion initial seating relation of shoulders 8 and 12 and 22 and 16. Such means may comprise interposed O-rings 23 and 24.

Means for retracting the absorber rod and for permitting it to drop into extended position are housed in housing 3 and comprise a flat tape 25 which may be formed from steel, Phosphor bronze or the like. One end of tape 25 is anchored to the upper end of absorber section 9 as by means of an anchor block 26 connected to a cross pin 26a in section 9. The other end of the tape is connected to a winding drum 27 rotatably mounted by means of a shaft 28 in a frame 29 in the housing. The tape is connected to the drum in such manner that it will be wound thereon when the drum rotates in one direction but will permit the drum to rotate freely in the other direction. To this end, the end of the tape is fixed to a pin 30 to which is also fixed one end of a circular flat spring 31. Spring 31 extends around the surface of the drum and has a hooked end 32 closely adjacent the pin 30. The drum surface is recessed at 33 to provide a shoulder 34 for engagement by the hook 32 and also to provide a space for reception of the pin 30. It will be apparent that, when the drum is rotating in a counterclockwise direction, as viewed in FIGURE 2, the hook 32 will engage the shoulder 34 and anchor the tape end to the drum for winding of the tape thereon. However, on rotation of the drum in a clockwise direction, the spring 31 is free to slip on the surface of the drum.

Means for driving the winding drum 27 in a counterclockwise direction comprises a motor 35 having its driven shaft 36 connected to the drum shaft 28 by means of gears 37 and 38.

Means for clutching the winding drum 27 to its driving shaft 28 to rotate the drum and for declutching it from shaft 28 to permit its rotation in a clockwise direction comprises a conventional magnetic clutch 39 diagrammatically indicated in FIGURE 3 and including a control switch 54 for disconnecting (and reconnecting) the clutch from its power supply. Thus, in order to declutch the drum from its driving shaft it is merely necessary to disconnect the power supply to the magnetic clutch. A tape guiding idler pulley 40 is also mounted in the housing by means of a frame 41. The pulley is located between the drum 27 and the bottom wall 2 of the housing and guides the section of the tape adjoining its connection to the rod section 9 in a vertical direction.

It will be apparent that, with the absorber rod in extended position, if the motor 35 is started and the clutch 39 energized, the tape 25 will be wound upon the drum 27 and will thus retract the rod sections 9 and 8.

Means are preferably provided for automatically stopping the motor when the rod sections are in fully retracted position and, as shown, comprises a switch 42 in the motor circuit 43 having a contact arm 44 engageable by an actuator rod or post 45 carried by the rod section 9 and projecting upwardly from the upper end thereof. An indicator 46 may be provided in the circuit to indicate the "Up" position of the absorber rod.

When it is desired to drop the absorber rod sections into fully extended position, the magnetic clutch 39 is de-energized and the sections 8 and 9 drop by gravity. The weight of the falling section pulls the tape off the drum freely and passes it over the idler pulley 40. When the rod section 9 reaches the end of its downward travel, the drum is rotating at a high rate of speed. However, at this point the tape stops and the drum continues to rotate until it coasts to a stop, this being permitted by means of the tape connection previously described.

Means are preferably provided for positively indicating the "Down" position of the absorber rod. To this end, a floating disc 47 in a frame member 48 rides upon the surface of the tape at its point of engagement with the idler pulley 40 and is urged into engagement with the tape surface by a roller 49 or the like carried by a spring contact arm 50 of a switch 51. The pulley 40 has a circumferential groove 52 in its periphery and the tape 25 has a longitudinal slot 53 in the end section thereof such that, when the tape is fully extended, the slotted portion of the tape engages the idler pulley 40. When this occurs the periphery of the floating disc 47 will move through the slot 53 and into the groove 52 of the pulley, thus allowing the contact arm 50 to move and actuate the switch. The switch 51 is located in the circuit of indicator 46 to provide a "Down" reading thereon.

I claim:

1. An absorber rod assembly for reactors comprising a supporting wall, an absorber rod having a first tubular section suspended from said wall in fixed relation thereto, at least one intermediate tubular section of less diameter than said first section for telescopic reception therein, and another tubular section of less diameter than said intermediate section for telescopic reception therein, shoulders carried by each said section and each engageable with said shoulder of another of said sections to limit outward movement of said intermediate section from said first section and of said other section from said intermediate section, a tape winding drum surmounting said wall, a tape having one end anchored to said other section and means connecting its other end to said drum, means driving said drum in one direction to wind said tape thereon and to retract said other section into telescopic reception in said intermediate section and to retract said intermediate and other sections into telescopic reception in said first section, and a clutch between said driving means and said drum energizable to disconnect said driving means from said drum to permit said drum to rotate freely in the opposite direction, said tape connecting means having a fixed position on said drum during rotation of said drum in said one direction and a freely slipping position on said drum during rotation of said drum in said opposite direction, said tape connecting means comprising a spring metal loop on said drum, said drum having a tape-receiving cylindrical surface, a recess in said surface, and a shoulder defining a wall of said recess, said loop having a hooked end receivable in said recess and engageable with said shoulder in response to said one direction of rotation of said drum to fixedly position said loop thereon, said loop having another end disposed in circumferentially spaced relation to said hooked end, and a pin fixed to said other end of said loop and also receivable in said recess, said other end of said tape being fixed to said pin.

2. An absorber rod assembly for reactors comprising a supporting wall, a housing mounted on said wall in surmounting relation thereto, a vertically disposed absorber rod having a first tubular section suspended from said wall in fixed relation thereto, at least one intermediate tubular section of less diameter than said first section for telescopic reception therein, and another tubular section of less diameter than said intermediate section for telescopic reception therein, shoulders carried by each said section and each engageable with said shoulder of another of said sections to limit outward movement of said intermediate section from said first section and of said other section from said intermediate section, a tape winding drum in said housing surmounting said wall and having a driving shaft, a tape having one end anchored to said other section and means connecting the other end to said drum, power means drivably connected to said shaft for driving said shaft and drum in one direction to wind said tape thereon and to retract said other section into telescopic reception in said intermediate section and to retract said intermediate and other sections into telescopic reception in said first section, said sections having an extended position with respect to each other defined by engagement of said shoulders and a retracted position defined by substantially fully telescopic reception with respect to each other, and a clutch between said power means and said shaft energizable to disconnect said power means from said shaft to permit said drum to rotate freely in the opposite direction for free fall of said tubular sections out of telescopic relation with each other, said tape connecting means having a fixed position on said drum during rotation of said drum in said one direction and a freely slipping position on said drum during rotation of said drum in said opposite direction, an idler pulley rotatably mounted in said housing between said drum and said absorber rod, said pulley having a cylindrical tape-engaging surface and an annular groove in said surface, said tape having riding engagement with said surface and overlying said groove, a disc riding on said tape at its point of engagement with said pulley, a frame member floatingly supporting said disc, and a circuit having a switch and an indicator therein, said switch having a spring contact arm engaging said disc, said tape having a longitudinal slot in one end section thereof, said slot permitting movement of said disc therethrough for reception in said groove, said movement of said disc actuating said contact arm of said switch.

References Cited in the file of this patent

UNITED STATES PATENTS

| 2,725,993 | Smith | Dec. 6, 1955 |
| 2,852,458 | Dietrich et al. | Sept. 16, 1958 |
| 2,900,316 | Kaufman et al. | Aug. 18, 1959 |
| 2,907,706 | Horning et al. | Oct. 6, 1959 |
| 2,971,041 | France | Feb. 7, 1961 |
| 2,984,609 | Dickson et al. | May 16, 1961 |

FOREIGN PATENTS

| 795,511 | Great Britain | May 28, 1958 |
| 216,256 | Australia | July 25, 1958 |

OTHER REFERENCES

Baker et al.: DP-100, USAEC report dated December 1954, declassified February 14, 1956, pages 6–8, 13, 16, 21, 23, 25, 26.